US009838853B1

(12) United States Patent
Bostick et al.

(10) Patent No.: US 9,838,853 B1
(45) Date of Patent: Dec. 5, 2017

(54) COGNITIVE SCHEDULING OF TEXT MESSAGE AVAILABILITY

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/171,007

(22) Filed: Jun. 2, 2016

(51) Int. Cl.
*H04W 24/00* (2009.01)
*H04W 4/12* (2009.01)
*H04W 4/14* (2009.01)
*H04W 4/02* (2009.01)
*G06F 17/27* (2006.01)

(52) U.S. Cl.
CPC .......... *H04W 4/12* (2013.01); *G06F 17/2785* (2013.01); *H04W 4/023* (2013.01); *H04W 4/14* (2013.01); *H04M 2250/10* (2013.01)

(58) Field of Classification Search
CPC ......... H04M 1/72547; H04M 1/72552; H04M 1/7255; H04M 3/42348; H04M 3/42382; H04M 3/5335; H04W 4/12; H04W 4/14; H04W 4/02; H04W 88/184
USPC ................. 455/404.1, 404.2, 456.1–457; 340/539.13, 988–996
See application file for complete search history.

(56) References Cited

U.S. PATENT DOCUMENTS

| 7,444,384 | B2 | 10/2008 | Horvitz |
| 2010/0042470 | A1 | 2/2010 | Chang et al. |
| 2015/0106467 | A1* | 4/2015 | Robarts ............ G06F 17/30867 709/207 |
| 2015/0266377 | A1 | 9/2015 | Hampiholi et al. |

OTHER PUBLICATIONS ip.com, Leveraging Semantic Analysis for Notification Management, Apr. 17, 2015.
printfriendly.com, 7 android apps to block unwanted calls and messages, 2015.
Spertus, Smokey: Automatic Recognition of Hostile Messages, 1997.
Eadicicco, Apple has a brilliant idea to make text messaging a whole lot better, Jun. 16, 2015.
O'Day et al; Text Message Corpus: Applying Natural Language Processing to Mobile Device Forensics.

* cited by examiner

*Primary Examiner* — Ronald Eisner
(74) *Attorney, Agent, or Firm* — Garg Law Firm, PLLC; Rakesh Garg; Christopher K. McLane

(57) ABSTRACT

A first message is received at a device at a first time. A textual content of the first message is analyzed to determine a language structure of the textual content. The first message is assigned a level based on a feature extracted from the language structure of the textual content. The level of the first message is adjusted to form an adjusted level according to a location-based factor based on a location of the device. The first message is scheduled on the device according to the adjusted level such that the first message becomes available for use on the device at a future time, the future time being after a delay after the first time.

20 Claims, 4 Drawing Sheets

COGNITIVE SCHEDULING OF TEXT MESSAGE AVAILABILITY

TECHNICAL FIELD

The present invention relates generally to a method, system, and computer program product for receiving text messages on a device. More particularly, the present invention relates to a method, system, and computer program product for cognitive scheduling of text message availability.

BACKGROUND

Text messaging is a common method of real-time electronic communication via textual data. One user or system inputs a textual message on a sender device, a data network transmits the textual message to another user or system on a receiver device. The sender device is usually a mobile device associated with a human user but can be a different type of computer or data processing system. A receiver device is a mobile device used by a human user. The receiver device is capable of data communication, generally over a cellular data communication network, a Wi Fi network, or both. Many data processing systems act as sender users generate text messages to human users acting as receivers of the text message.

A text message is generally human readable text comprising alphanumeric characters in some natural language, symbols, and icons such as emoji. Natural language is written or spoken language having a form that is employed by humans for primarily communicating with other humans or with systems having a natural language interface.

Natural language processing (NLP) is a technique that facilitates exchange of information between humans and data processing systems. For example, one branch of NLP pertains to transforming human readable content into machine usable data. For example, NLP engines are presently usable to accept input content such as a newspaper article or a whitepaper, and produce structured data, such as an outline of the input content, most significant and least significant parts, a subject, a reference, dependencies within the content, and the like, from the given content.

Shallow parsing is a term used to describe lexical parsing of a given content using NLP. For example, given a sentence, an NLP engine determining what the sentence semantically means according to the grammar of the language of the sentence is the process of lexical parsing, to wit, shallow parsing. In contrast, deep parsing is a process of recognizing the relationships, predicates, or dependencies, and thereby extracting new, hidden, indirect, or detailed structural information from distant content portions in a given document or some corpora.

SUMMARY

The illustrative embodiments provide a method, system, and computer program product. An embodiment includes a method that receives, at a device, a first message at a first time. The embodiment analyzes a textual content of the first message to determine a language structure of the textual content. The embodiment assigns the first message a level based on a feature extracted from the language structure of the textual content. The embodiment adjusts the level of the first message to form an adjusted level, using a processor and a memory, according to a location-based factor based on a location of the device. The embodiment schedules, according the adjusted level, the first message on the device such that the first message becomes available for use on the device at a future time, the future time being after a delay after the first time.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
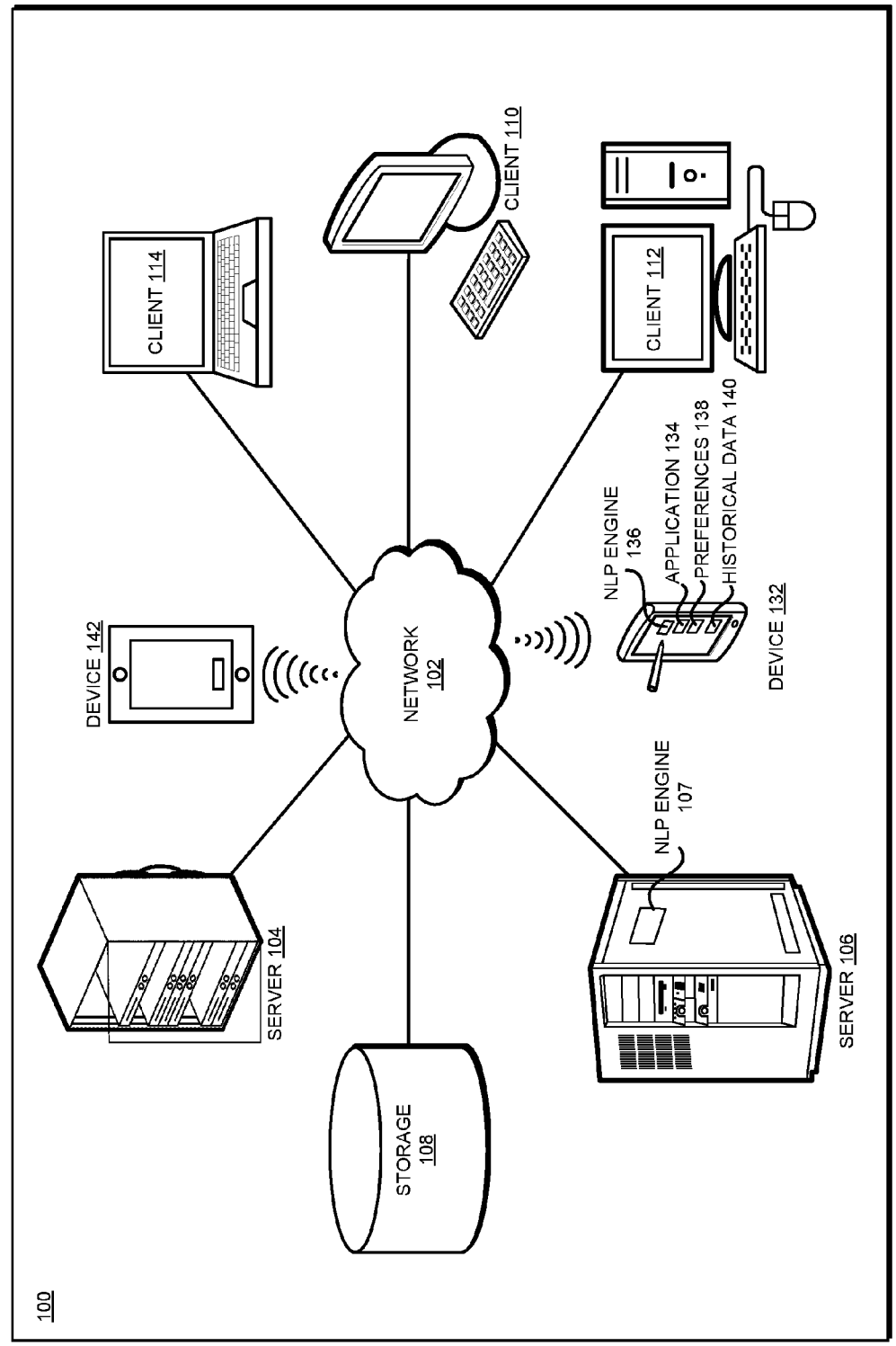
FIG. 1 depicts a block diagram of a network of data processing systems in which illustrative embodiments may be implemented.

A reference to a "user" hereinafter is a reference to a human user who receives a text message, unless expressly disambiguated where used. A reference to a "message" hereinafter is a reference to a text message, unless expressly disambiguated where used.

The illustrative embodiments recognize that presently, a text message is presented to the user as soon as the text message is received on the receiving device. A sender can sometimes attach metadata to a message, such as an indicator of importance, which is useful in altering the manner in which the receiving device presents the message to the user.

Generally, a text message is delivered to a receiver device and presented to the user in real-time, to wit, as soon as possible after a sending device sends the message and the receiving device receives the message taking into account any transmission delays in the network not in the control of the sending device or the receiving device. For example, if a receiving device is connected to a data network over which text messages can be delivered, the receiving device presently receives the message as soon as the network delivers the message to the receiving device, and the receiving device makes the received message available to the user thereafter without deliberately adding any delay.

A delay can be caused if the receiver device is configured to not receive messages from the data network at all, such as by turning off the cellular data communications, e.g., in the "airplane" mode of mobile devices. But there too, as soon as the receiving device connects to the network, any messages that are awaiting delivery in the network are delivered and presented on the receiving device. In such circumstances, the delay is in the receiving of the messages, not in presenting the messages after the messages have been received at the receiving device.

A receiving device can be configured in a "do not disturb" (DND) mode, whereby any notifications of the receipt of new messages is suppressed until the device comes out of the DND mode. Here too, the receiving of the messages occurs in real-time from the network to the receiving device, the messages are available to the user for review immediately after they have been received at the receiving device, just that any overt new-message notification to inform or "disturb" the user is suppressed. The user is still able to go to the folder or app used for message delivery and review the newly received messages without the notification. Messages from certain senders, e.g., senders in a list specified by the user, or government agencies, or emergency services, can still avoid the DND setting and notify the user.

In other words, the illustrative embodiments recognize that presently, there is no mechanism or method that can receive a text message and add a delay of more than the processing time of receiving and presenting the message on the device, in making the message available to the user. Stated yet another way, the illustrative embodiments recognize that presently, there exists no mechanism or method that can deliberately change an order or sequence of received text messages to an order or sequence that is different from the order in which the messages are received at the receiving device. Furthermore, there exists no mechanism or method that can deliberately delay the availability for use of a message that has already been received at the receiving device, particularly based on the content of the message itself, activity in which the user is engaged when the message is received, historical responses to similar messages by the user, and other factors.

For example, the illustrative embodiments recognize that presently, there is no mechanism or method to receive a first message, schedule the delivery of the first message such that the user does not even know that the first message has been received and is prevented from accessing the first message until fifteen minutes, two hours, or three days from the time of receiving the first message.

Furthermore, the illustrative embodiments recognize that presently, there is no mechanism or method to receive a second message after the first message described above, and scheduling the delivery of the second message such that the user does not even know that the first message has been received before the second message, and is prevented from accessing the first message until some computed period of time after the second message has been made available for viewing to the user.

Additionally, the illustrative embodiments recognize that presently, no mechanism or method is available that is completely resident on the receiving user's receiving device, that does not use or require any metadata or indications to be added by a sender user or system or a sending device, for altering the presentation of a text message on the receiving device. Particularly, the illustrative embodiments recognize that presently, no mechanism or method is available that is executes on the receiving user's receiving device, that does not rely on any metadata or indications—even if added to a text message by a sender user or system or a sending device, for scheduling when the text message becomes available to the receiving user on the receiving device.

The illustrative embodiments recognize that in many circumstances, it is desirable to delay making a received message available to the user, resequence the order of messages where an earlier received message is made available for use later as compared to another message. The illustrative embodiments further recognize that such delaying or rescheduling functionality should be based, at least in part, upon the contents of the message itself, without any indicators supplied with the contents by the sender or the sender's role or identity.

The illustrative embodiments used to describe the invention generally address and solve the above-described problems and other problems related to delaying or scheduling at a receiving device the availability of a message.

For example, the illustrative embodiments provide the receiving device the ability to understand the content of a message through NLP, and use the understanding obtained in conjunction with the time of day, the place of user's presence, the current activity of the user, and even the history of the user's actions relative to past messages, and many other factors related to text messages. Based upon such factors, an embodiment enables the receiving device to make an accurate determination as to whether any given message should be made available to the user right away upon receipt or scheduled for delivery at a different time, or in a different manner—such as in a junk messages location, or both.

Various levels of importance can thus be associated with incoming messages at the receiving device. For example, one or more levels can be deemed "high importance levels," one or more levels can be deemed "medium importance levels," one or more levels can be deemed "low importance levels," for associating with the incoming messages.

As an example, based on the cognitive NLP analysis of the content of messages, one level may allow making a message available without delay, another level may only allow emergency messages to become available to the user without delay, another level may defer delivery until the user begins or completes a certain activity, another level may defer delivery until the user arrives or leaves a certain location, another level may defer delivery until the beginning or end of a specified period or duration, another level may defer delivery until a specified time. Many levels, including these and other similarly purposed levels can be set up with varying conditions configuring the delay, sequence, or schedule of incoming messages before those messages become available for use by the user on the device.

For example, using an embodiment, a user is able to configure the receiving device so that different levels of messages are made available for use at different times. For example, between the hours of 10 PM and 6:00 AM only "important" level messages, or messages that have an urgency to the user—according to an NLP analysis of the content—are made available regardless of DND setting on the device, any sender identity, or tags or identifiers associated with the message. For example, a message with content "your house is on fire" from a neighbor should become available without any delay according to this example, but "are you going to that seminar" may be delayed.

Similarly, between the hours of 10 AM and 6:00 PM only messages with a "family" level or higher according to an analysis of the content are made available regardless of settings on the device or identifiers associated with the message. For example, a message with content "your child fell off the swing at the park" from a friend should become available without any delay according to this example but the message "hey want to get some coffee on Friday" from the same friend may be delayed.

As another example, when the user is in a library only messages with a "n" level value or higher according to an analysis of the content are made available regardless of settings on the device or identifiers associated with the message. For example, a message with content "delivery guy at the door" from a home automation system should become available without any delay according to this example but the message "package delivered" from the delivery guy may be delayed.

As another example, when the user is in Paris, France, only messages with a "x" level value or higher, or of "family" category or higher, according to an analysis of the content, are made available regardless of settings on the device or identifiers associated with the message. For example, a message with content "don't forget my souvenir" from a friend should become available with or without delay while the use is still in Paris, according to this example but the message "got an extra ticket for tonight's game" from a local friend in Hometown, USA, may be delayed because the user cannot attend the game in Hometown tonight if he is remaining in Paris through tomorrow according to his schedule on the device.

As another example, messages with an "invitation" level may be delayed because the user historically does not respond to "invitation" type of messages or go to the invited locations in the "invitation" type of messages, but the message "confirmed tickets to the 'by invitation only' event" may be delivered with or without delay according to other rules, e.g., based on the location, time of day, present user activity, and other factors. For example, if the message about the confirmed tickets arrives when the user is jogging in the park or sleeping, the message may be delayed, but if the user is at the venue of the event, the message may be delivered without delay.

As another example, messages with a "entertainment notification" level may be filed at junk text for the user to review at the user's convenience, but the message "rented movie past due" from a movie rental system may be delivered with or without delay according to other rules as described herein.

As another example, some messages with an "urgent" level may trigger additional activity, e.g., audio read out or other audible alerting to the user. Such additional activity may occur with or without delay according to other rules as described herein.

An embodiment also allows a user to set these types of capabilities via a profile or preferences. An embodiment also allows configuring a user-specified rule to override a preference.

An embodiment allows configuration of message delays based on the capabilities of the device. For example, when the device is capable of detecting user activities, such as jogging, driving, stationary, sleeping, awake, or some other defined activity, different factors can be considered according to different rules for configuring a delay in making a message available for use. As another example, when the device is capable of detecting a user's location, such as by attributing a Global Positioning System (GPS) location of the device to the user, the location-based factors—e.g., distance between a place named in the content of a message and the present location, a type of building at the location, historical duration of user's presence at the location or type of location, etc.—can be considered according to different rules for configuring a delay in making a message available for use.

A method of an embodiment described herein, when implemented to execute on a device or data processing system, comprises substantial advancement of the functionality of that device or data processing system in managing text message delivery to the user. For example, presently available methods deliver a text message for immediate use by the user upon receiving the text message. An embodiment analyzes the content of the message, classifies, categorizes, or otherwise associates a level with the message. The embodiment further uses a set of factors in computing the level. The embodiment schedules the availability of the message according to the level and user preferences. This manner of cognitive scheduling of text message availability is unavailable in the presently available methods. Thus, a substantial advancement of such devices or data processing systems by executing a method of an embodiment is in assisting a text messaging user by cognitively managing the delivery and availability of text messages to the user.

The illustrative embodiments are described with respect to certain types of messages, levels, categories, classifications, rules, factors, preferences, outputs, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
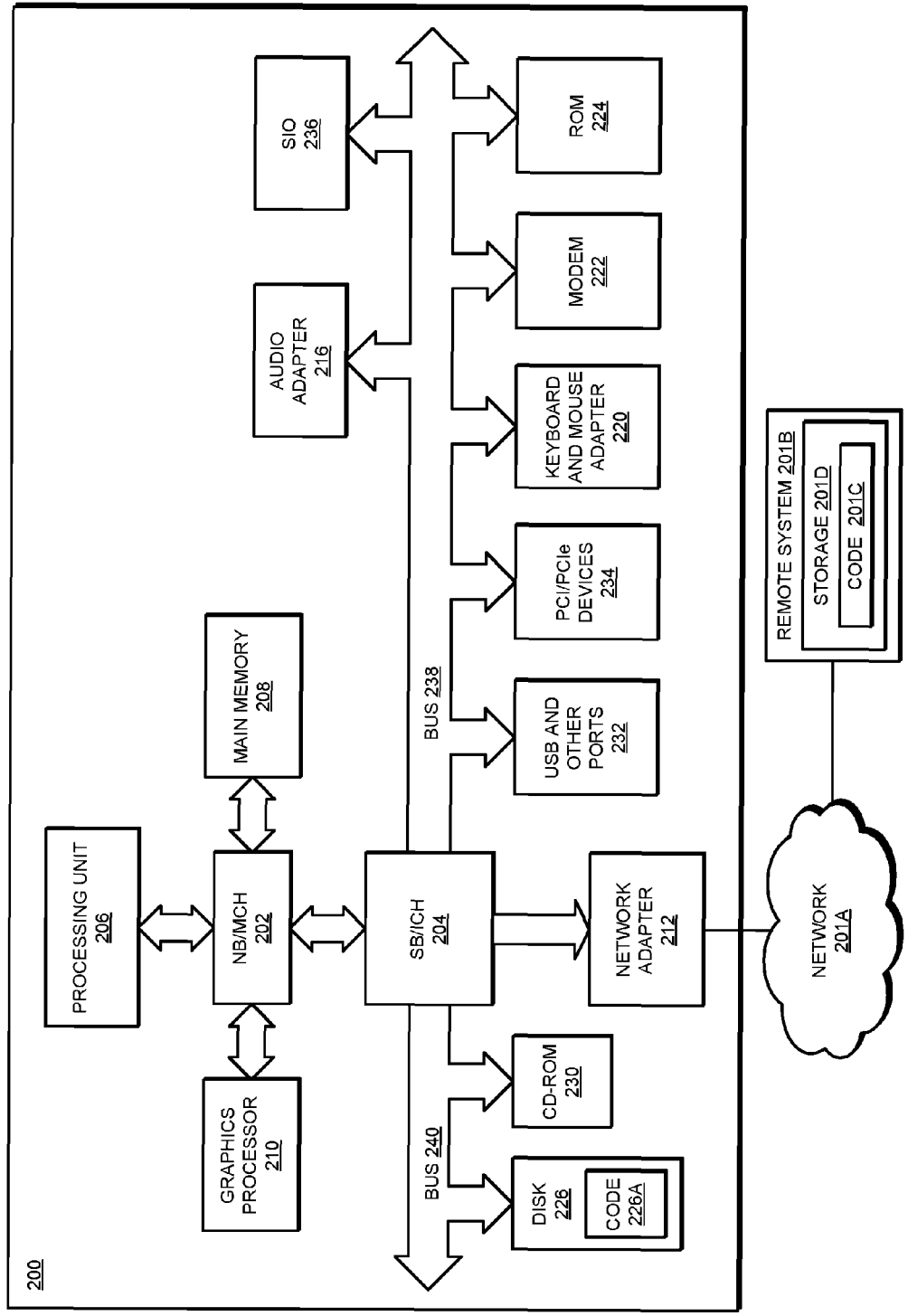
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Device 132 is a receiving device as described herein. Device 142 is an example of a sending device that sends a text message to device 132. Application 134 Implements an embodiment described herein. NLP engine 107 in server 104 reachable from device 132 over network 102 is one example configuration in which application 134 uses a remote NLP engine for analyzing text messages, when network 102 is available to device 132, as described herein. NLP engine 136 in device 132 is another example configuration in which application 134 uses a local NLP engine, either by solely or as a preferred default, or as a backup NLP engine when remote NLP engine 107 is unavailable to device 132, for analyzing text messages as described herein. Device 132 stores user preferences 138 and historical data 140. Historical data 140 includes data about past user actions or interactions relative to the content of the messages of various levels.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 or 142 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may Include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
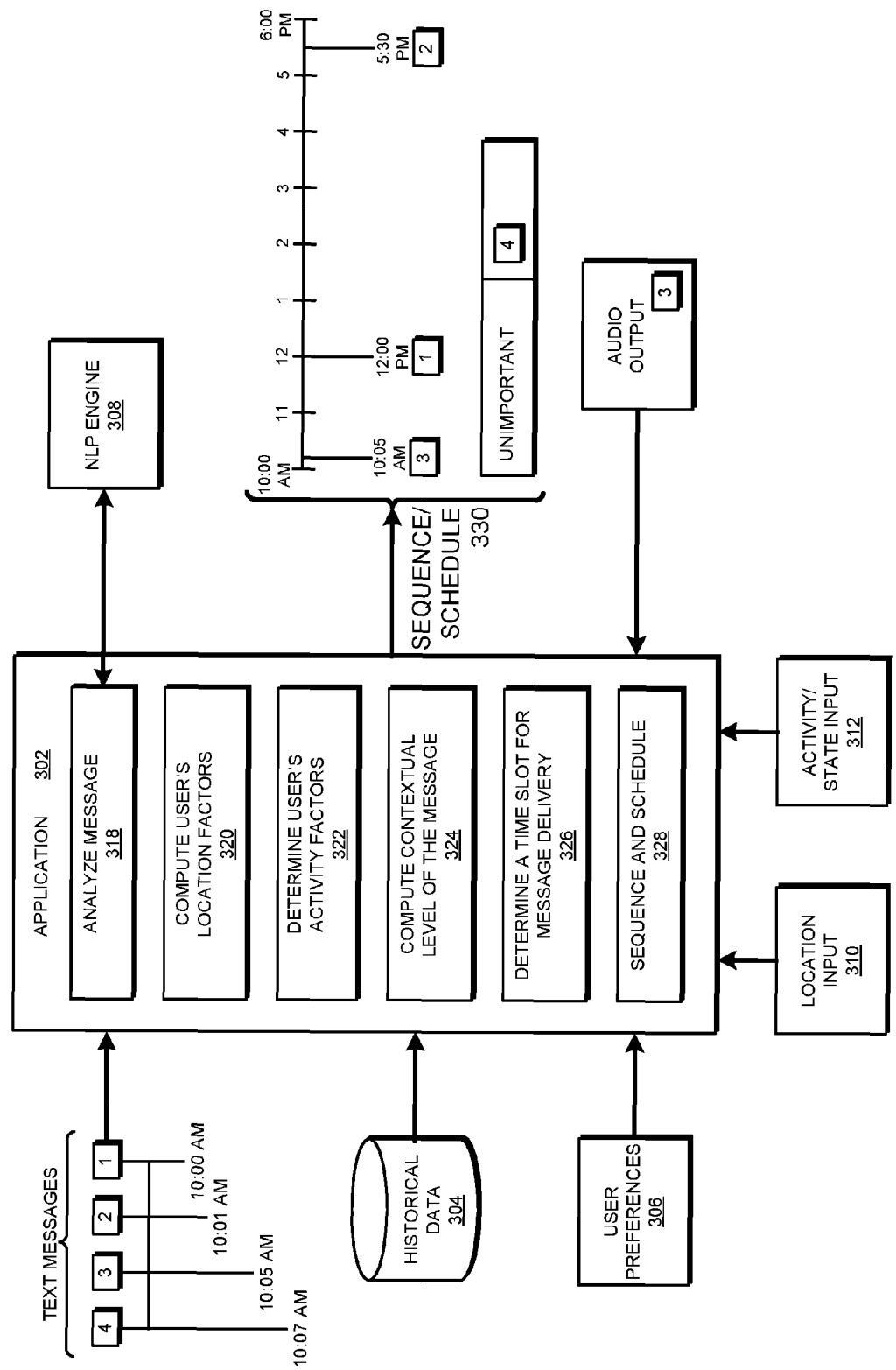
FIG. 3 depicts a block diagram of an example configuration for cognitive scheduling of text message availability in accordance with an illustrative embodiment.

With reference to FIG. 3, this figure depicts a block diagram of an example configuration for cognitive scheduling of text message availability in accordance with an illustrative embodiment. Application 302 is an example of application 134 in FIG. 1. Historical data 304 is an example of historical data 140, set of user preferences 306 is an example of preferences 138, NLP engine 308 is an example of either NLP engine 136 or NLP engine 107, respectively, in FIG. 1.

Location input 310 comes from a location detection functionality in, or associated with, the device where application 302 is executing. For example, a GPS module in the device may provide location input 310. User activity or user state input 312 comes from an activity detection functionality in, or associated with, the device where application 302 is executing. For example, an accelerometer in the device, a gyroscopic apparatus coupled with the device, or a wearable apparatus coupled with the device can monitor user activities and provide activity input 312.

Assume that example text messages 1, 2, 3, and 4 arrive, from a data network, at the device where application 302 is executing. Assume that the time of arrival at the device and the time of sensing the arrival of the messages by the application 302 are substantially the same, with any processing time within the device for communicating the arrival to application 302 being negligible.

Further assume that the example time of arrival of message 1 is 10:00 AM; the example time of arrival of message 2 is 10:01 AM; the example time of arrival of message 3 is 10:05 AM; and the example time of arrival of message 4 is 10:07 AM. Presently available methods would make text messages available for use in the order of their arrival, i.e., message 1 first, message 2 second, message 3 third, and message 4 fourth.

Component 318 analyzes the contents, i.e., the textual data in the body of the text messages. For this analysis, component 318 uses NLP engine 308, which can perform a shallow parsing, a deep parsing, or both, of the contents. Using the output of NLP engine 308, component 318 determines a context, verb, subject, object, or some combination thereof, of a message.

Using location input 310, component 320 computes a location-based factor associated with the location of the user to whom text messages 1-4 are directed. For example, location input 310 may provide the geographical location coordinates of the user. Using map data (not shown) or other data sources (not shown), component 320 may determine that the coordinates are in a library building. Accordingly, using the data sources, or a user preference in preferences 306, component 320 determines that presence in a library building implies that the user is engrossed in research and prefers not to be disturbed, and therefore an example location-based factor is seeing only those messages whose levels exceed a threshold.

Similarly, using the data sources, or a user preference in preferences 306, component 320 determines that presence in a courthouse building implies a 'no texting' policy applicable to most courts and has few exceptions. Therefore, another example location-based factor is seeing only those messages whose levels indicate personal emergency situations.

These examples of location-based factors are not intended to be limiting. From this disclosure, those of ordinary skill in the art will be able to conceive many other location-based factors and the same are contemplated within the scope of the illustrative embodiments.

Using activity input 312, component 322 computes an activity-based factor associated with the activity of the user to whom text messages 1-4 are directed. For example, activity input 310 may provide the type of the current activity of the user. Using a data source (not shown), component 322 may determine that the type of activity, e.g., driving, implies that the user is focusing on an important task, and therefore an example activity-based factor is seeing only those messages whose levels exceed a threshold.

Similarly, using the data source, or a user preference in preferences 306, component 322 determines that the user is engaged in a sleeping type of activity. Therefore, another example activity-based factor is seeing only those messages whose levels indicate family emergency situations.

These examples of activity-based factors are not intended to be limiting. From this disclosure, those of ordinary skill in the art will be able to conceive many other activity-based factors and the same are contemplated within the scope of the illustrative embodiments.

Using the analysis from component 318, a location-based factor from component 320, an activity-based factor from component 322, or some combination thereof, component 324 computes a contextual level of a message. A contextual level of a message is an overall level, or net level, computed using a base level, e.g., a level according to the NLP analysis of the message, and adjusting the base level according to level adjustments corresponding to one or more other factors.

For example, the context of an analyzed message may warrant level 6 for the message, but a location-based factor may warrant increasing the level to 7, and an activity-based factor may warrant decreasing the level to 4, resulting in a net contextual level of 5 for the message. Any suitable mathematical computation, formula, or function can be used to compute the contextual level based on one or more outputs of components 318, 320, and 322.

In one embodiment, component 324 also factors into the contextual level historical data 304. For example, component 324 determines whether according to the content of the message, the message is of a type or level to which the user has previously responded according to historical data 304. Historical data 304 may inform not only whether the user responds to certain types or levels, but how the user responds to those messages of those types or levels. For example, historical data 304 may provide that the user usually reviews entertainment notification level of messages and visits a link in that level of message during 6 PM to 10 PM.

These examples of historical data 304 are not intended to be limiting. From this disclosure, those of ordinary skill in the art will be able to conceive many other types of information that can be stored and used from historical data 304 in a similar manner, and the same are contemplated within the scope of the illustrative embodiments.

Based on the contextual level of a message, component 326 determines a suitable time or period (collectively referred to as a time slot) at or during which the message should be made available on the device to the user. Component 326 also determines, whether the location where the message should be delivered should be changed, e.g., from a default folder for messages to a folder for junk or unimportant messages.

Component 328 sequences and schedules a message with other messages that are processed in a similar manner. The sequencing may change the order of the messages from the order of their arrival. The sequencing may also change a destination folder or space where the message becomes available to the user. The scheduling is a part of the sequencing in that a position of the message in the sequence is according to the time slot, to wit, schedule or scheduled time or period, during which the message should be made available.

For example, even though example messages 1, 2, 3, and 4 arrived in that order, component 328 may cause message 3 to be made available immediately, i.e., as close to the arrival time as possible on the device, as is depicted in example sequence or schedule 330. Component 328 may cause message 1 to be made available at noon, e.g., when a present user activity completes, another user activity begins, the user leaves the present location, the user arrives at another location, or some combination thereof, as is also depicted in example sequence or schedule 330.

Component 328 may cause the availability of message 2 to be delayed until 5:30 PM, as is also depicted in example sequence or schedule 330. Again, as a non-limiting example, the time slot 5:30 PM or thereabouts may be selected because that may be when a present user activity completes or another user activity begins according to calendar data on the device, the user leaves the present location or the user arrives at another location according to planning or email correspondence data on the device, or some combination other activities and location factors using other types of data sources.

Assume that the contextual level of message 4 computed to significantly below a threshold level, making the message unimportant. Accordingly, component 328 may cause the availability of message 4 to be at the user's convenience and cause message 4 to be placed in a location for unimportant messages, as is also depicted in example sequence or schedule 330.

Figure 4:
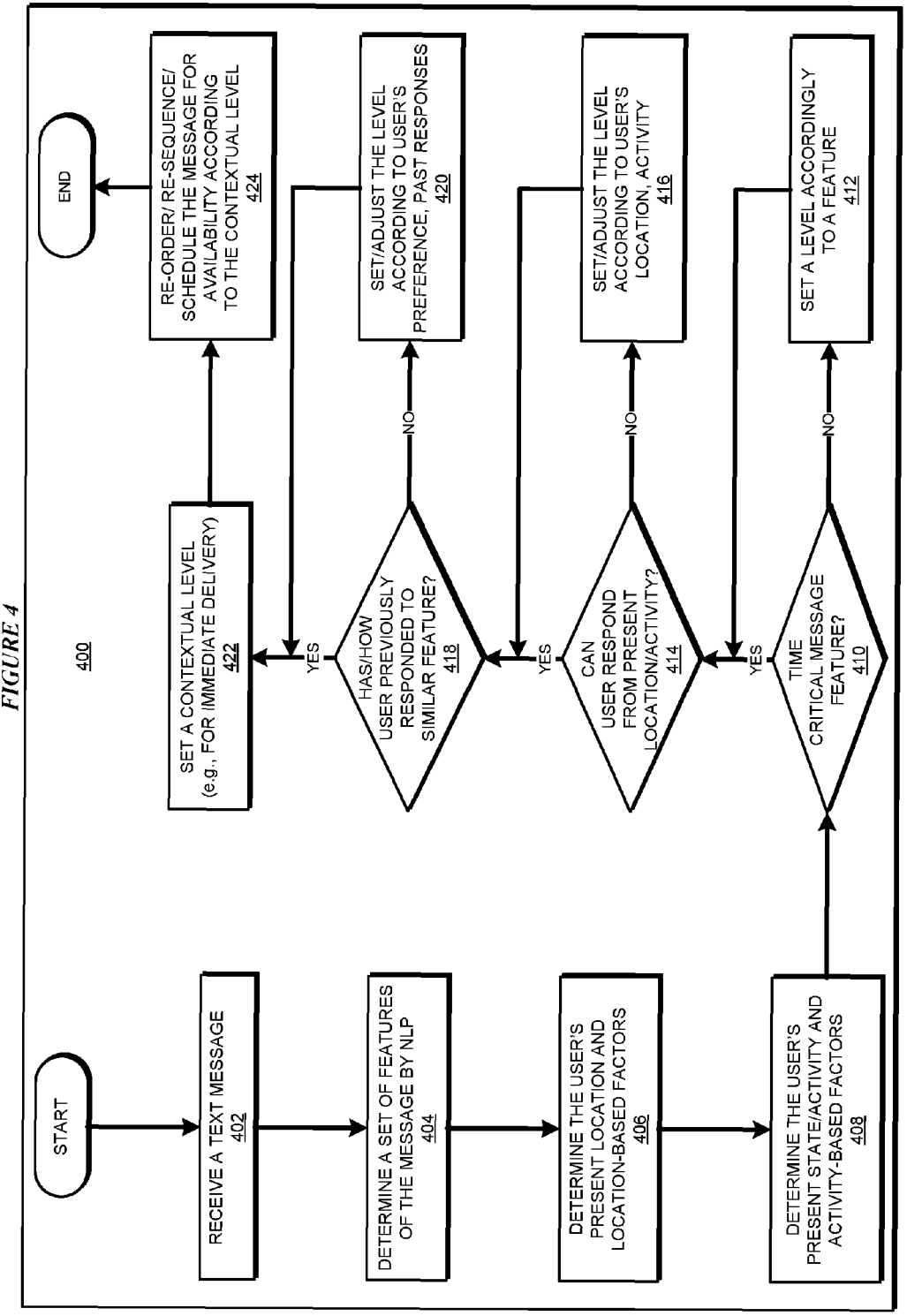
FIG. 4 depicts a flowchart of an example process for cognitive scheduling of text message availability in accordance with an illustrative embodiment.

With reference to FIG. 4, this figure depicts a flowchart of an example process for cognitive scheduling of text message availability in accordance with an illustrative embodiment. process 400 can be implemented in application 302 in FIG. 3.

The application receives a text message (block 402). The application determines a set of features of the message, such as by performing NLP as describe herein (bock 404).

The application determines a target user's location and one or more location-based factors (block 406). The application determines the user's activity and one or more activity-based factors (block 408). One embodiment uses only location-based factors and thus omits block 408. Another embodiment uses only activity-based factors and thus omits block 406. Another embodiment uses both—the location-based factors and the activity-based factors, and thus performs both blocks 406 and 408.

The application determines whether the NLP analysis of the contents of the message indicates that the message is time critical (block 410). If the message is time critical, e.g., according to a preference or threshold, ("Yes" path of block 410), the application proceeds to block 414. If the message is not time critical ("No" path of block 410), the application sets a level according to a feature extracted from the NLP processing (block 412) and proceeds to block 414.

The application determines whether the user can respond from the present location and/or while engaged in the present activity, e.g., according to a location-based factor, an activity-based factor, or both (block 414). If the user can respond, ("Yes" path of block 414), the application proceeds to block 418. If the user cannot respond ("No" path of block 414), the application sets or adjusts the level of the message according to a location and/or activity factor (block 416) and proceeds to block 418.

The application determines whether and how the user has previously responded to the feature extracted from the message, e.g., according to the user's historical data (block 418). If the user has responded, e.g., in some predetermined manner, or has a preference about how to adjust a level of a message having that feature ("Yes" path of block 418), the application proceeds to block 422. If the user has not responded, or responded in some other predetermined manner, or has a different preference about how to adjust a level of a message having that feature ("No" path of block 414), the application sets or adjusts the level of the message according to the user's preference, past response, or both (block 420).

The application sets a contextual level for the message (block 422). The application re-orders, re-sequences, or schedules the availability of the message according to the contextual level (block 424). The application ends process 400 thereafter.

Thus, a computer implemented method, system or apparatus, and computer program product are provided in the illustrative embodiments for cognitive scheduling of text message availability and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, at a device, a first message at a first time;
analyzing a textual content of the first message to determine a language structure of the textual content;
assigning the first message a level based on a feature extracted from the language structure of the textual content;
adjusting, using a processor and a memory, to form an adjusted level, the level of the first message according to a location-based factor based on a location of the device; and
scheduling, according the adjusted level, the first message on the device such that the first message becomes available for use on the device at a future time, the future time being after a delay after the first time.

2. The method of claim 1, further comprising:
further adjusting, to form a further adjusted level, the adjusted level according to a preference of a user, the preference being related to the feature and the location-based factor; and
replacing, for use in the scheduling, the adjusted level of the first message with the further adjusted level of the first message.

3. The method of claim 1, further comprising:
further adjusting, to form a further adjusted level, the adjusted level of the first message according to an activity-based factor according to a type of an activity being performed by a user; and
replacing, for use in the scheduling, the adjusted level of the first message with the further adjusted level of the first message.

4. The method of claim 3, further comprising:
determining, from the type of the activity, using the processor and the memory, and using supplemental data, a condition applicable to the first message during the activity of the type; and
evaluating, using the processor and the memory, the condition into the activity-based factor.

5. The method of claim 1, further comprising:
determining from the location of the device, using the processor and the memory, and by using supplemental data, a condition applicable to the first message at the location; and
evaluating, using the processor and the memory, the condition into the location-based factor.

6. The method of claim 1, wherein the feature is an object word according to the language structure of the textual content.

7. The method of claim 1, wherein the feature is a subject word according to the language structure of the textual content.

8. The method of claim 1, wherein the feature is a verb word according to the language structure of the textual content.

9. The method of claim 1, further comprising:
processing, as a part of the analyzing, the textual content of the first message using Natural Language Processing (NLP).

10. The method of claim 1, wherein the textual content is a detailed textual data to be communicated to a user in a body of the first text message.

11. The method of claim 1, further comprising:
receiving a second message at a second time, the second time being after the first time and before the future time, wherein the scheduling causes the first message, which was received at the first time, to become available for use after the second message.

12. A computer usable program product comprising one or more computer-readable storage devices, and program instructions stored on at least one of the one or more storage devices, the stored program instructions comprising:
program instructions to receive, at a device, a first message at a first time;
program instructions to analyze a textual content of the first message to determine a language structure of the textual content;
program instructions to assign the first message a level based on a feature extracted from the language structure of the textual content;
program instructions to adjust, to form an adjusted level, the level of the first message according to a location-based factor based on a location of the device; and
program instructions to schedule, according the adjusted level, the first message on the device such that the first message becomes available for use on the device at a future time, the future time being after a delay after the first time.

13. The computer usable program product of claim 12, further comprising:
program instructions to further adjust, to form a further adjusted level, the adjusted level according to a preference of a user, the preference being related to the feature and the location-based factor; and
program instructions to replace, for use in the scheduling, the adjusted level of the first message with the further adjusted level of the first message.

14. The computer usable program product of claim 12, further comprising:
program instructions to further adjust, to form a further adjusted level, the adjusted level of the first message according to an activity-based factor according to a type of an activity being performed by a user; and
program instructions to replace, for use in the scheduling, the adjusted level of the first message with the further adjusted level of the first message.

15. The computer usable program product of claim 14, further comprising:
program instructions to determine from the type of the activity, using a processor and a memory, and using supplemental data, a condition applicable to the first message during the activity of the type; and
program instructions to evaluate, using the processor and the memory, the condition into the activity-based factor.

16. The computer usable program product of claim 12, further comprising:
program instructions to determine from the location of the device, using a processor and a memory, and by using supplemental data, a condition applicable to the first message at the location; and
program instructions to evaluate, using the processor and the memory, the condition into the location-based factor.

17. The computer usable program product of claim 12, wherein the feature is an object word according to the language structure of the textual content.

18. The computer usable program product of claim 12, wherein the computer usable code is stored in a computer readable storage device in a data processing system, and wherein the computer usable code is transferred over a network from a remote data processing system.

19. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive, at a device, a first message at a first time;
program instructions to analyze a textual content of the first message to determine a language structure of the textual content;
program instructions to assign the first message a level based on a feature extracted from the language structure of the textual content;
program instructions to adjust, to form an adjusted level, the level of the first message according to a location-based factor based on a location of the device; and
program instructions to schedule, according the adjusted level, the first message on the device such that the first message becomes available for use on the device at a future time, the future time being after a delay after the first time.

* * * * *